L. BISSELL & R. VAN BUREN.
Combined Truck and Bag Holder.
No. 206,855.         Patented Aug. 13, 1878.
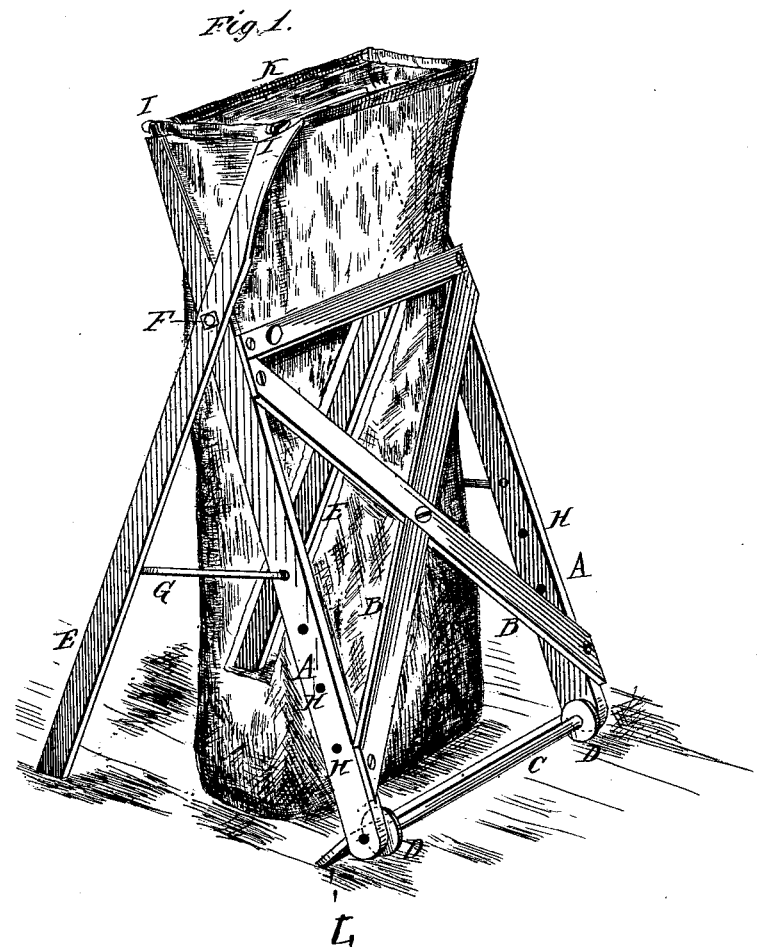

UNITED STATES PATENT OFFICE.

LORENZO BISSELL AND RICHARD VAN BUREN, OF WADSWORTH, OHIO.

IMPROVEMENT IN COMBINED TRUCK AND BAG-HOLDER.

Specification forming part of Letters Patent No. 206,855, dated August 13, 1878; application filed February 26, 1878.

*To all whom it may concern:*

Be it known that we, LORENZO BISSELL and RICHARD VAN BUREN, of Wadsworth, in the county of Medina and State of Ohio, have invented certain new and useful Improvements in Bag-Holder and Grain-Truck Combined; and we do hereby declare that the following is a full, clear, and exact description thereof, which will enable others skilled in the art to which it appertains to make and use the same, reference being had to the accompanying drawing, and to the letters of reference marked thereon, which form a part of this specification.

Our invention or improvement in bag-holders and trucks combined consists in a pair of arms pivoted to the side rails of the truck and provided with hook-braces and other devices, all of which will be fully explained in the following specification.

In the accompanying drawing, the figure is a perspective view of our combined truck and bag-holder.

This truck is constructed with side rails A and a foot-board, L, and provided with wheels D and axle C in the usual manner. These side rails are connected by a cross-bar, O, and cross-braces B, thus forming a light frame. Two arms, E, are pivoted to the side rails A by means of nut-bolts F, so as to vibrate in converting the bag-holder to a truck or the truck to a bag-holder, as will be readily understood by persons familiar with the art. The hooks or rods G are adjustable by means of holes H in rails A, so as to properly hold a wide or narrow bag by first setting the arms E and then hooking in the rods G into holes H, as mentioned.

Both the side rails A and the vibrating arms E are provided with brads or hooks I for holding the bag K, as shown in the drawing. The foot-board L receives the bottom of the bag K when filled, and the truck is tilted down to move the bag. By the construction of the bag-holder and truck no flooring is necessary, as the bag is received on the foot-board L, the braces B, and the bar O. Therefore my truck is very light.

When the bag-holder is in use the hook-braces G are hooked into the holes H in the side rails A, so as to keep the bag-holder steady. Both the ends of the rails A and of the arms E have small hooks or brads I, to catch the mouth of the bag K and hold the same open, as shown in the drawings, so as to be readily filled. After the bag is filled the truck is tilted over so as to receive the bag ready for being trucked away in the usual manner. The upper ends of the arms E are hollowed out or shaped to fit the hand in moving the truck in the usual manner.

We are aware that rollers or caster-wheels have been put upon the feet of bag-holders. Therefore we do not claim the separate devices above described, but limit our claim to the combination of a bag-holder and truck as a whole.

Having described our invention, we claim—

1. The combination of a truck and bag-holder, the whole being convertible at pleasure into a bag-holder by placing the same in erect position, or a truck by tilting it over, for transporting the bag when filled, substantially in the manner set forth.

2. The above-described truck and bag-holder combined, having the side rails A, provided with wheels D and foot-board L, and cross-braces B, and hooks or brads I, in combination with the arms E, also having brads or hooks I, and connected to rails A by means of pivot-bolts F, and made adjustable by hooks or rods G, substantially as and for the purposes set forth.

In testimony that we claim the foregoing as our own we affix our signatures in presence of two witnesses.

LORENZO BISSELL.
RICH. VAN BUREN.

Witnesses:
J. E. KREIDER,
A. KREIDER.